United States Patent [19]

Jung

[11] Patent Number: 4,529,483
[45] Date of Patent: * Jul. 16, 1985

[54] PROCESS FOR UTILIZING WASTE HEAT AND PRODUCING WATER GAS DURING THE COOLING OF COKE

[75] Inventor: Richard A. Jung, Gummersbach, Fed. Rep. of Germany

[73] Assignee: Hartung, Kuhn & Co. Maschinenfabrik GmbH, Dusseldorf, Fed. Rep. of Germany

[*] Notice: The portion of the term of this patent subsequent to Mar. 20, 2001 has been disclaimed.

[21] Appl. No.: 529,204

[22] Filed: Sep. 6, 1983

[30] Foreign Application Priority Data

Sep. 23, 1982 [DE] Fed. Rep. of Germany ....... 3235261

[51] Int. Cl.³ .................... C10B 39/02; C10B 39/04
[52] U.S. Cl. ........................... 201/39; 48/202; 201/41
[58] Field of Search ............... 201/39, 41; 202/227, 202/228

[56] References Cited

U.S. PATENT DOCUMENTS

| | | | |
|---|---|---|---|
| 3,988,211 | 10/1976 | Lewandowski et al. | 202/228 |
| 4,066,513 | 1/1978 | Jablin | 202/227 |
| 4,100,034 | 7/1978 | Smith et al. | 202/228 |
| 4,211,607 | 7/1980 | Privalov et al. | 201/39 |
| 4,288,294 | 9/1981 | Velling | 202/228 |
| 4,370,202 | 1/1983 | Weber et al. | 201/39 |
| 4,409,067 | 10/1983 | Smith | 201/39 |
| 4,416,733 | 11/1983 | Likhogub et al. | 201/39 |
| 4,437,936 | 3/1984 | Jung | 201/39 |

FOREIGN PATENT DOCUMENTS

| | | | |
|---|---|---|---|
| 3000808 | 7/1981 | Fed. Rep. of Germany | 202/228 |
| 53-71102 | 6/1978 | Japan | 201/39 |

Primary Examiner—Peter Kratz
Attorney, Agent, or Firm—Dressler, Goldsmith, Shore, Sutker & Milnamow, Ltd.

[57] ABSTRACT

A process for utilizing waste heat and producing water gas during cooling of red-hot coke, in two stages, is indicated. In a first, dry cooling stage, a mixture of water gas and steam passes the coke charge, is recooled in a heat sink and recirculated into the first cooling stage, whereby it is possible to take off a part quantity of the gas mixture. In a second, wet cooling stage, water is fed into a quench zone and the steam formed is passed through the coke charge partially into the first cooling stage and partially released into the surroundings or fed back into the second cooling stage or partly released into the surroundings and partly fed back into the second cooling stage. Both the mixture of water gas and steam in the first cooling stage and the quench water or the steam formed from it in the second cooling stage are passed through the coke charge from the inside outwards.

4 Claims, 3 Drawing Figures

PROCESS FOR UTILIZING WASTE HEAT AND PRODUCING WATER GAS DURING THE COOLING OF COKE

The invention relates to a process and to equipment for utilizing waste heat and producing water gas during the cooling of red-hot coke, pushed out of a chamber oven, in two stages, according to U.S. patent application Ser. No. 361,053 filed Mar. 23, 1982, now U.S. Pat. No. 4,437,936.

RELATED PRIOR ART

German Offenlegungsschrift No. 2,455,496 has disclosed equipment for the dry cooling of coke, which consists of an upright vessel with coke feed at the top and discharge of the cooled coke at the lower end, the feed line for circulated cooling gas being located in the lower region of the vessel and the discharge being located in the upper region. As in all units with exclusive dry cooling of the coke to a sufficiently low outlet temperature, this equipment also results in a large requirement of space and time for cooling.

German Offenlegungsschrift No. 2,533,606 discloses a process and equipment for cooling coke, the temperature of the coke being lowered in a first cooling stage to about 315° to 425° C. by passing inert gas through and then being lowered yet further in a second cooling stage by spraying with water. In this case, the steam formed in the second cooling stage is prevented from penetrating into the vessel of the first cooling stage by relatively extensive constructional measures.

German Patent Specification No. 472,510 describes a process for the dry cooling of fully carbonized coke by means of inert gases. By adding water to the cooling gas, water gas is produced in the coke charge, and this is burnt at a heat-consuming point.

Additionally, processes have also been disclosed, in which red-hot coke is cooled with steam. However, in these cases, the production of water gas and the discharge of the cooled coke take place only discontinuously (compare German Patent Specification Nos. 413,372, 414,138 and 490,981), or further coolant components are also required in addition to water or steam (compare German Patent Specification No. 567,067 and German Offenlegungsschrift No. 2,808,804).

Compared with this state of the art, the process and the equipment according to U.S. patent application Ser. No. 361,053, filed Mar. 23, 1982 has the advantage of simple and rapid recovery of the waste heat from the coke, with the simultaneous formation of controllable quantities of water gas.

It is the object of the invention to accelerate the cooling of the coke and hence the recovery of the waste heat and the water gas even further, to avoid hot pockets in the discharged coke and to discharge a coke of constant high quality continuously from the cooling equipment.

SUMMARY OF THE INVENTION

According to the invention, this stated object is achieved by a process of the type initially set forth, in which (a) in a first, dry cooling stage, a mixture of water gas and steam enters the lower region of a cooling zone, rises in counter-current through the coke charge dropping in the cooling zone and absorbs heat, leaves the cooling zone in the upper region thereof, is re-cooled in a heat sink, purified and then recirculated into the lower region of the cooling zone, it being possible to take off a part quantity of the recycled gas mixture before it enters the cooling zone, and (b) in a second, wet cooling stage at a coke temperature which is lower than that in the first cooling stage, water is fed into a quench zone and the steam formed there is passed partially upwards through the coke charge into the cooling zone and partially downwards into a discharge zone, is taken off from there, purified and released into the surroundings and/or fed back into the quench zone, and the cooled coke is discharged via the discharge zone.

The process comprises a flow from the inside outwards through the coke charge for both the mixture of water gas and steam in the first cooling stage and for the quench water or the steam formed from it and the recycled steam in the second cooling stage.

In this procedure, the cold cooling gas, the quench water and the steam recycled into the quench zone always strike the hottest regions, that is to say the inner regions of the coke charge. The coolants are forced to penetrate the coke charge completely. It is therefore impossible for a case to arise where the coolants flow through the coke charge, for example, only in the outer regions of the cooling zone or quench zone and thus, on the one hand, suffer losses of cooling capacity at the wall of the cooling zone or quench zone and, on the other hand, leave hot pockets behind in the center of the coke charge.

Preferably, the coke charge is passed in the form of an annular flow through the cooling zone and the quench zone. As a result, a closed coke flow is obtained which presents a large contact area to the coolants.

According to a particular embodiment of the process, heat is additionally removed from the outside of the coke charge to be cooled. As a result, the cooling of the coke and hence the recovery of waste heat and of the water gas formed from the quench water are even further accelerated.

It has proved to be advantageous to effect this additional heat removal by means of an evaporative cooling system. Because of the relatively high latent heat of vaporization, utilized here, such a system is particularly suitable for the absorption of large quantities of heat within a short time.

The features of the equipment claims relate to an advantageous embodiment of equipment for carrying out the process mentioned above.

In the text which follows, the process according to the invention is explained by reference to the drawing of an illustrative embodiment of equipment for carrying out this process.

Figure 1:
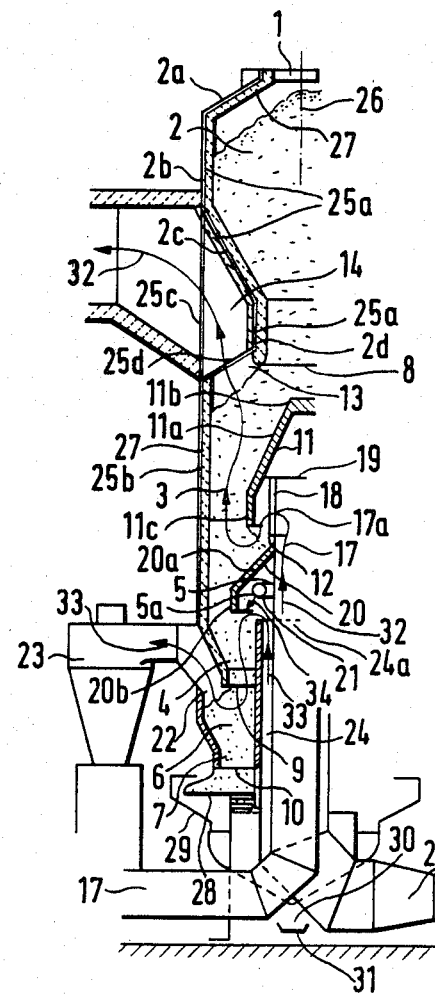
FIG. 1 diagrammatically shows a part of a longitudinal section through the most important parts of the equipment.

Those parts of the equipment which are mentioned in the description of the figures, which follows, but not shown in the drawing are to be found in the drawing of U.S. patent application Ser. No. 361,053, filed Mar. 23, 1982.

DESCRIPTION OF THE PREFERRED EMBODIMENT

According to FIG. 1, the equipment comprises a charging hole 1, a primary chamber 2 which can be closed, a cooling chamber 3, a quench chamber 4 with a water-spray device 5, a take-off casing 6 and a discharge chamber 7, located underneath one another in each case.

The primary chamber 2, the quench chamber 4 and the take-off casing 6 have outlets 8, 9 and 10 respectively, which taper downwards in the form of a funnel.

The primary chamber 2 has an upper conical part 2a which is connected to the charging hole 1 and concentrically widens downwards. The upper part 2a merges into a cylindrical first middle part 2b of the primary chamber 2, which is adjoined by a second middle part 2c which tapers concentrically downwards. The concentrically tapered, second middle part 2c ends in a cylindrical lower part 2d.

In its outer boundaries, the cooling chamber 3 is cylindrical. At a height of about two thirds of its upper half, the cooling chamber 3 is provided in its center with a guide element 11 for the coke charge. The guide element 11 comprises an upper section 11a which widens conically downwards and has a rounded cone top 11b, and a lower cylindrical section 11c.

In the cooling chamber 3, there are free spaces 12, 13 below the guide element 11 and laterally below the outlet 8 of the primary chamber 2, respectively.

A cooling-gas discharge line 14 leads away from the free space 13 in the cooling chamber 3 via a heat sink 15 shown in FIG. 2, a cyclone separator 16 and a fan not shown in the drawing and, according to FIG. 1, reenters the cooling chamber 3 from below as the cooling-gas feed line 17. The cooling-gas feed line 17 here extends axially upwards through the take-off casing 6 and the quench chamber 4 as far as the free space 12 below the guide element 11 in the cooling chamber 3.

The end of the cooling-gas feed line 17 is adjoined by a pipe branch 18 with radial outlet openings 17a for the cooling gas. At its upper end, the pipe branch 18 is closed by a plate 19 which projects radially beyond the pipe branch 18 and the edge of which serves as a support for the inside of the upper conical section 11a of the guide element 11.

A further guide element 20 comprising an upper section 20a in the shape of a truncated cone and a lower cylindrical section 20b for the coke charge is arranged in the lower half of the cooling chamber 3. The upper end of the section 20a is fixed to, but sealed from, the cooling-gas feed line 17.

Below the guide element 20, there is an annular space 21 of the quench chamber 4, which space remains free of the coke charge and in which the water-spray device 5 is located. The latter is designed as an annular tube provided with quench water outlet openings 5a.

From the take-off casing 6, a steam discharge line 22 leads via a cyclone separator 23 and a fan, not shown in the drawing, to a steam feed line 24 to which also an exit steam pipe, not shown in the drawing and leading into the open, is connected.

The steam feed line 24 enters the quench chamber 4 axially from below, the steam feed line 24 coaxially surrounding the cooling-gas feed line 17 and ending in the annular space 21 below the guide element 20.

The walls of the primary chamber 2 and of the cooling chamber 3 each have an annular cooling jacket 25a, 25b, through which water flows and which are mutually connected by cooling tubes 25c, 25d.

The cooling tubes 25c connect the upper end of the cooling jacket 25b of the cooling chamber 3 to the cooling jacket 25a on the middle cylindrical part 2b of the primary chamber 2 and extend here like a grid through the initial section of the cooling-gas discharge line 14. The cooling tubes 25c extend parallel to the axis 26 of the equipment (compare FIG. 2) and are arranged at the same distance from this axis 26 as the cooling jacket 25a on the part 2b of the primary chamber 2 and as the cooling jacket 25b of the cooling chamber 3 (compare FIG. 3).

The cooling tubes 25d connect the upper end of the cooling jacket 25b to the lower end of the cooling jacket 25a on the lower cylindrical part 2d of the primary chamber 2 and here extend in the region of the free space 13 through the initial section of the cooling-gas discharge line 14. The cooling tubes 25d extend from the upper end of the cooling jacket 25b of the cooling chamber 3 obliquely upwards radially to the axis 26 of the equipment and end in the lower end of the cooling jacket 25a of the primary chamber 2.

Figure 3:
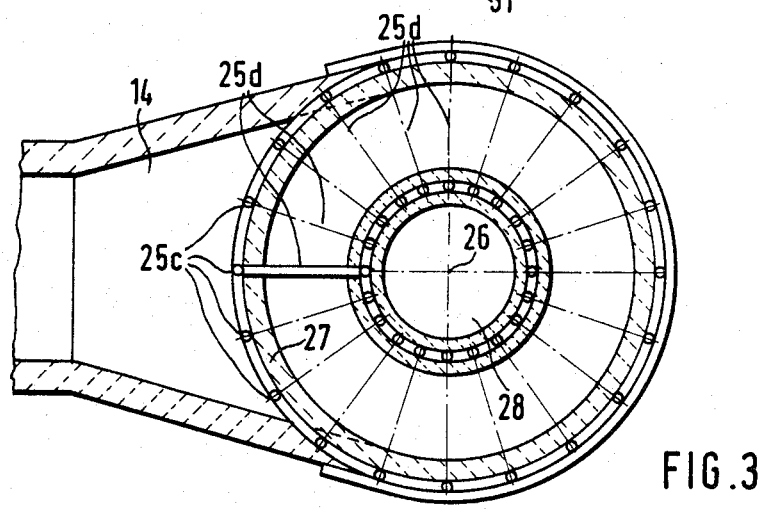
Figure 2:
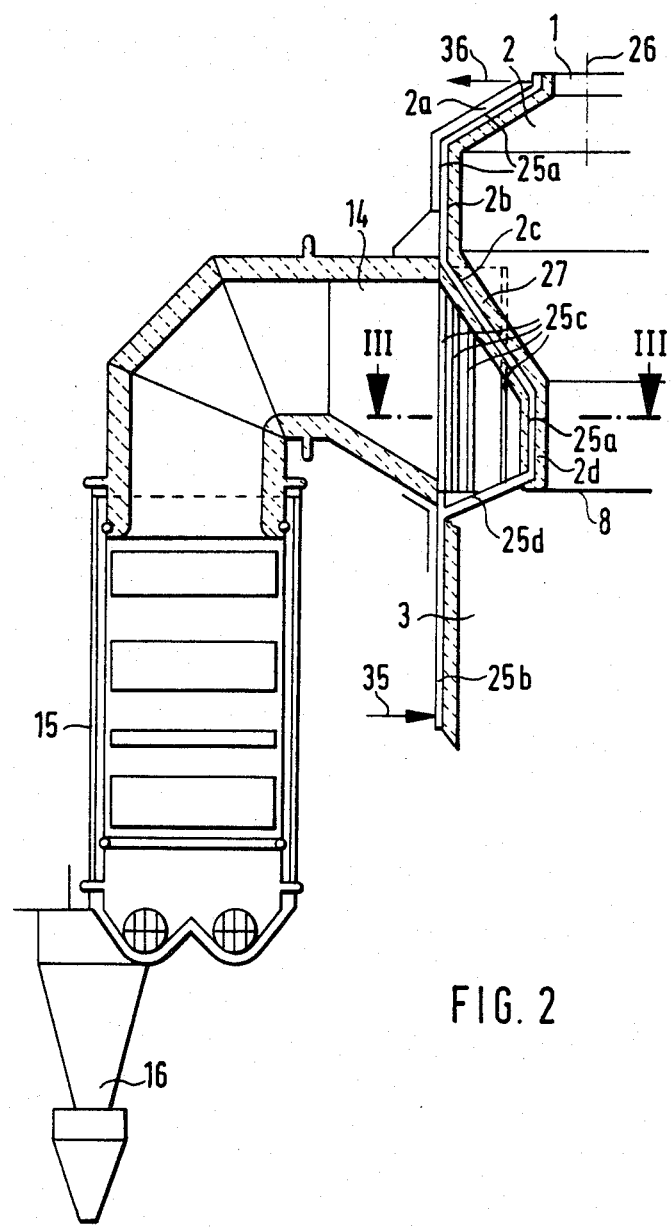
FIG. 2 diagrammatically shows a part of a longitudinal section through the equipment in the region of the cooling-gas discharge line with an adjoining coarse separator, and FIG. 3 diagrammatically shows a part of a cross-section through the equipment, along the cut line III—III in FIG. 2.

In FIG. 3, a cross-section corresponding to the cut line III—III in FIG. 2 is illustrated, and it shows the cooling tubes 25c, arranged on a circular line regularly with respect to the axis 26 of the equipment, in the free cross-section of the cooling-gas discharge line 14.

To prevent wear and overheating of the cooling jackets 25a, 25b, they are lined with a protective material 27.

A rotary table 28 is arranged below the discharge chamber 7. It ensures uniform discharge of the cooled coke, the motion of the rotary table 28 effecting a further thorough mixing of the coke during the discharge and thus evening out any minor regions of different temperatures, which may still be present in the coke charge.

Below the rotary table 28, there is a funnel-shaped coke-collecting device 29, the upper rim of which extends around the rim of the rotary table 28 at a distance.

Below the outlet opening 30 of the collecting device 29, a conveyor device 31, for example a conveyor belt, is provided for transporting the coke away.

The process according to the invention proceeds as follows:

As in known dry cooling with inert gas, the coke is introduced batchwise from above, with exclusion of air, through the charging hole 1 into the equipment and is continuously discharged at the bottom through the discharge chamber 7. On its travel through the primary chamber 2, the cooling chamber 3 and the quench chamber 4, the coke is cooled from about 1100° C. on entry to about 100° C. at the outlet. As an intermediate store, in which the level rises abruptly and drops gradually, the primary chamber 2 enables the cooling chamber 3 which, for example, has an internal diameter of 5 m, to be operated in a steady state. In the cooling chamber 3, a cooling gas consisting essentially of water gas ($CO+H_2$) and steam is passed from the center of the coke charge in counter-current through the coke and is thus heated from about 150° C. at the end of the cooling-gas feed line 17 to about 600° to 850° C. at the start of the cooling-gas discharge line 14. The last-mentioned temperature, of 600° C., of the cooling gas applies to the production of the maximum quantity of water gas in the hot zone of the cooling chamber 3. The water gas is formed here in accordance with the endothermic reaction $C+H_2O \rightarrow CO+H$ from the steam ($H_2O$) in the cooling gas and the carbon (C) in the coke. By means of this reaction, a part of the heat to be recovered is removed from the coke, whereby the temperature of the latter is lowered. The dimensions and the operating data of the equipment are mutually matched in such a way that the coke has been cooled to below 400° C. when it enters the quench chamber 4.

The hot cooling gas, flowing out via the free space 13 in the cooling chamber 3 into the cooling-gas discharge line 14, is cooled to about 150° C. in the heat sink 15, for example a waste heat boiler for the generation of relatively high-pressure secondary steam as the working fluid for a steam-powered process, and is purified in the cyclone separator 16 from entrained coke dust. Subsequently, the cooling gas is passed by means of a fan into the cooling-gas feed line 17 to the cooling chamber 3.

A cooling-gas take-off line, through which a part of the cooling gas can be taken off for alternative uses of the water gas contained therein, is connected to the cooling-gas feed line 17.

In the steady state, the mass fraction of the water gas in the cooling-gas take-off line corresponds to the water gas produced in the coke charge. To compensate for the steam removed with the cooling gas taken off and that consumed in the production of water gas, an equivalent quantity of water is introduced into the quench chamber 4 via the water-spray device 5. The quantity of water fed as quench water into the water-spray device 5 can also contain that quantity of water which has been formed by condensation of the steam contained in the cooling gas taken off.

In the quench chamber 4, the quench water is sprayed by means of the water-spray device 5 in the annular space 21 in the direction of the coke charge which is still hot. The quantity of steam generated by vaporization of the quench water corresponds to the sum of the part quantities of steam, which flow away from the quench chamber 4, on the one hand, upwards into the cooling chamber 3 and, on the other hand, downwards through the funnel-shaped outlet 9 of the quench chamber 4 via the take-off casing 6, the steam discharge line 22, the cyclone separator 23 and a fan. Downstream of the fan, the steam flow is passed, as desired, via an exit steam line into the open and/or via the steam feed line 24 back into the quench chamber 4. The steam flow circulating through the steam discharge line 22 and the steam feed line 24, together with the setting of the steam quantity taken off via the exit steam pipe, makes it possible to balance the steam pressure in the discharge chamber 7 with the surrounding pressure and to regulate the steam part flow passed from the quench chamber 4 into the cooling chamber 3. This part flow is adjustable between a value of 0, in which case the entire quantity of steam generated in the quench chamber 4 is passed through the exit steam pipe into the open, and a maximum value which equals this steam quantity when the exit steam pipe is closed. The particular setting is characterized by the gauge pressure of the recycled steam in the quench chamber 4 as compared with the gas pressure of the cooling gas when it enters the cooling chamber 3 from the cooling-gas feed line 17, this gas pressure in turn being determined by the pressure drop of the cooling gas in the cooling chamber 3 and by the gas pressure in the primary chamber 2, which is equal to the surrounding pressure. The production of water gas, the composition of the cooling gas and the cooling gas flow removed from the system via the cooling-gas discharge line vary with the steam flow passed from the quench chamber 4 into the cooling chamber 3.

To purify the steam formed in the quench chamber 4 and removed via the steam discharge line 22, it is also possible to use several separators, for example four cyclone separators with a particle size limit of 0.015 mm.

With a coke throughput of 100 tonnes/hour, a fan power of about 250 kW is selected for the circulation of the cooling gas through the cooling chamber 3, and a fan power of about 165 kW is selected for circulating the steam through the quench chamber 4.

In the primary chamber 2 and the cooling chamber 3, the coke charge is additionally cooled by means of the evaporative cooling system. A part of the heat in the coke is here absorbed by the cooling jackets 25a, 25b of the primary chamber 2 and the cooling chamber 3. In the cooling jackets 25a, 25b and in the cooling tubes 25c, 25d, water of a temperature of 100° C. flows, which thus represents the evaporative cooling system. This additional heat removal not only shortens the cooling time of the coke, but it also assists in avoiding excessive thermal expansion of the various wall elements of the primary chamber 2 and the cooling chamber 3, since the temperature of the evaporative cooling system does not exceed 100° C. and ensures a constant outside temperature of the primary chamber 2 and the cooling chamber 3.

Via the take-off casing 6 and the discharge chamber 7, the cooled coke passes onto the rotary table 28 and is again thoroughly mixed there by the motion thereof, any temperature differences which may still be present in the coke charge being balanced. The coke dropping over the edge of the rotary table 28 is received by the collecting device 29 and fed, via the opening 30 thereof, to a conveyor belt 31 which transports the coke away.

In FIG. 1, the arrow 32 illustrates the path of the cooling gas from the cooling-gas feed line 17 via the cooling chamber 3 into the cooling-gas discharge line 14, the arrow 33 illustrates the path of the steam from the steam feed line 24 via the quench chamber 4 and the take-off casing 6 to the steam discharge line 22, and the arrow 34 illustrates the issuing of the quench water from the water-spray device 5.

In FIG. 2, the arrow 35 denotes the entry of water at about 100° C., to be boiled in the evaporative cooling system, into the cooling jacket 25b and the arrow 36 denotes the issuing of the water-steam mixture of this cooling system from the cooling jacket 25a.

What is claimed is:

1. A process for utilizing waste heat and producing water gas during the cooling of a red-hot coke charge pushed out of a chamber oven, in two stages, in which (a) in a first, dry cooling stage, a mixture of water gas and steam enters the lower region of a cooling zone, rises in counter-current flow through the coke charge dropping through the cooling zone and absorbs heat, leaves the cooling zone in the upper region thereof, is recooled in a heat sink, purifed and then at least in part recirculated into the lower region of the cooling zone, whereby, if desired, a part quantity of the recirculated steam and water gas mixture is taken off before it enters the cooling zone, and (b) in a second, wet cooling stage at a coke temperature which is lower than that in the first cooling stage, water is fed into a quench zone and the steam formed there is passed partially upwards through the coke charge into the cooling zone and partially downwards into a discharge zone, is taken off from said discharge zone, purified and released into the surroundings or fed back into the quench zone or partly released into the surroundings and partly fed back into the quench zone, and the cooled coke is discharged via the discharge zone whereby the process includes a flow from the inside outwards through the coke charge for both the mixture of water gas and steam in the first cooling stage and the quench water or the steam formed from it and the steam fed back into the quench zone in the second cooling stage.

2. A process claimed in claim 1, wherein the coke charge is passed in the form of an annular flow through the cooling zone and the quench zone.

3. A process claimed in claim 1 or 2, wherein heat is additionally removed from the outside of the coke charge to be cooled.

4. A process as claimed in claims 1 or 2, wherein the heat is additionally removed from the outside of the coke charge to be cooled by means of an evaporative cooling system.

* * * * *